April 30, 1957     R. G. COX     2,790,654
SELF ALIGNING HOSE FITTING FOR HOSES
HAVING AN ECCENTRIC BORE
Filed Dec. 10, 1951
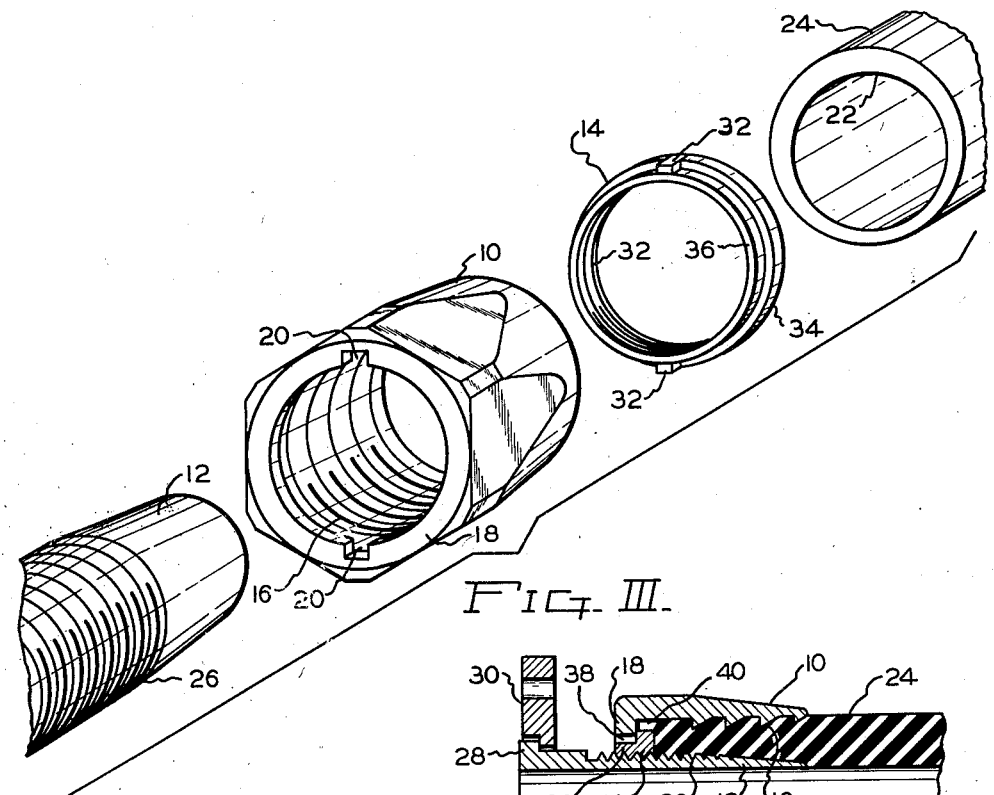
FIG. III.
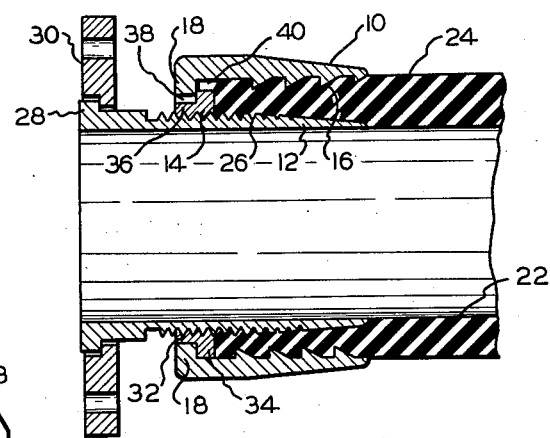
FIG. II.
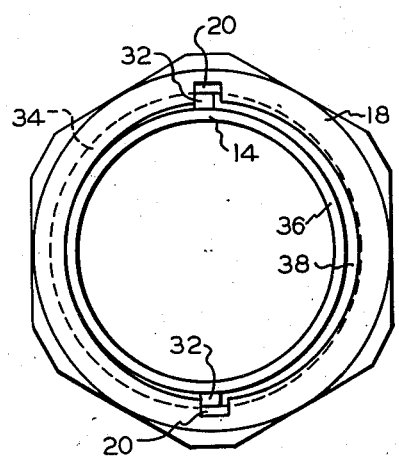
FIG. I.
INVENTOR
ROBERT G. COX
BY Townsend Beaman
ATTORNEY 2,790,654

SELF ALIGNING HOSE FITTING FOR HOSES HAVING AN ECCENTRIC BORE

Robert G. Cox, Jackson, Mich., assignor to Aeroquip Corporation, Jackson, Mich., a corporation of Michigan Application December 10, 1951, Serial No. 260,823

1 Claim. (Cl. 285—251)

This invention relates to socket and nipple end fittings as employed on flexible hose to form coupling connectors and of the kind in which the socket is secured upon the outside of the hose whereas the nipple is screwed through one end of the socket and into the hose bore, the thus assembled socket and nipple defining an annular space between them in which an end portion of the hose is held firmly gripped.

In connection with smaller size hose, the attachment of these socket and nipple end fittings presents little difficulty but as the hose size (diameter) increases the difficulty presents itself of accommodating the increasing eccentricity between the inner and outer hose surfaces inherent in the present day production of flexible hose.

This eccentricity becomes pronounced in the case of flexible hose lines of the order of 4″ diameter and upwards, with an eccentricity range of up to 1/16″ being frequently encountered.

Where, as is usual, the nipple of the end fitting has a right-hand exterior screw threaded portion which requires to be screwed through concentric internal screw threading on the socket the assembly of the end fitting upon the eccentric hose surfaces offers increasing difficulty proportional to the eccentricity encountered.

It is an object of the present invention to provide an improvde hose end fitting which when applied to the flexible hose is self-adjustable to any eccentricity existing between the inner and outer hose surfaces.

It is also an object of the invention to provide a hose end fitting of the above described kind in which the screwed socket opening into which the nipple is inserted is capable of partaking of floating movement in a radial plane, i. e. in a plane normal to the longitudinal axis of the socket and nipple assembly, whereby to accommodate any eccentricity between the interior and exterior hose surfaces as the nipple is screwed into position upon the socket.

The above and other objects and advantages of the invention, residing in the construction, arrangement and combination of parts, will become clear or apparent from a consideration of the following detail description with reference to the accompanying drawings and from the appended claim.

In the drawings:

Fig. I is an end elevational view of a socket and ring assembly in accordance with the invention, Fig. II is a longitudinal sectional view showing a socket-nipple-ring assembly in accordance with the invention assembled upon a hose end portion, and Fig. III is an exploded view of the fitting parts and hose end portion.

In the drawings an end fitting for flexible hose is provided comprising an outer socket 10, an inner nipple 12 and a separately formed ring member 14.

The socket is formed with internal screw threads or circumferential teeth for gripping into the outer surface of the hose and has an inturned radial flange 18 at one end, in which flange diametrically opposed key slots 20 are formed.

The nipple 12 is formed to be inserted into the hose bore 22 after the socket 10 has been assembled upon the exterior of the hose 24, and is shown formed with right-hand screw threading 26 in its exterior surface, which upon screwing of the nipple endwise through the ring member 14 from the right hand end of the socket as seen in Fig. II causes the hose end portion, as it becomes gripped within the annular space thus defined between the nipple and the socket, to be drawn to the left.

A collar at the outer end of the nipple serves for the location of the conventional securing flange 30.

The ring member 14 is also screw threaded on its interior surface, as indicated at 32, and forms a screw threaded opening in the socket end through which the nipple can be screwed into the hose bore, the ring 14 being loosely connected within and to the interior socket 10 by the engagement of axial keys 32 on the ring engaging in the key slots 20.

The ring member 14 is also formed with an outwardly directed radial flange 34 on its inner end portion for sliding engagement behind the socket flange 18 and defining a reduced outer end portion 36 which is located within the opening 38 defined by the socket flange 18.

Fig. III shows the hose with eccentric inner and outer surfaces and Figs. I and II show the nipple, socket and ring assembly compensating for such eccentricity, which, as above stated, occurs in present day flexible hose production, particularly in large size hose of, for example, 4 inch diameter and upwards. To this end, the outer diameter of the ring portion 36 is smaller than the diameter of the opening 38 while the outer diameter of the ring flange 34 is correspondingly smaller than the internal diameter of the socket as represented by the portion thereof indicated at 40 (Fig. II). The clearance thereby presented between these parts is sufficient to permit the ring member 14 to float radially as the nipple is screwed into the eccentric hose bore 22 whereby to compensate for this eccentricity and enable the screwed connection between the nipple 12 and the socket ring 14 to be effected with minimum effort.

The keys 32 are shown fitted into the ring flange 34 to extend axially therefrom upon the reduced ring portion 36 for location in the key slots 20, which slots while shown with circumferential clearance with respect to the keys 32 restrict any appreciable relative rotation between the ring and socket, with the keys engaged in the slots 20. At the same time the slots 20 are large enough to permit the desired floating movement to take place, while the depth of the keys 32 is also such that the ring flange 34 engages behind the socket flange 18 for all positions of adjustment of the floating ring.

Having thus described the invention, what I claim as novel and wish to secure by Letters Patent is as follows:

Hose and end fitting structure comprising an outer socket and an inner nipple, said socket being fitted axially over the exterior surface of the hose from one end thereof, said socket having an integral inturned radial flange at one end presented to the said hose end and defining an opening in the socket at said end, a separate ring member mounted within said socket at said end, said ring member having an outwardly turned integral radial flange in engagement with the interior surface of said socket flange and having an axial extent not substantially greater than the axial extent of said socket flange and having a reduced portion of the ring member positioned within said socket flange opening said reduced portion having an axial extent not substantially greater than the axial extent of said socket flange, said ring member being screw-threaded on its interior, said inner nipple having exterior screw-threading, said nipple being screwed through said ring interior into engagement with the hose bore and compressing the hose between the socket and the nipple upon relative axial displacement between the screw connected nipple and ring member and the socket, said socket flange opening being of greater diameter than the external diameter of the said ring member portion positioned therein and the external diameter of said ring member flange being smaller than the internal diameter of said socket at said socket flange end, and a radial slot in said inturned radial flange interconnecting with an integral radial projection on said reduced portion of said ring member to permit relative radial displacement between said radial flanges but preventing relative rotation between said ring member and said socket.

References Cited in the file of this patent

UNITED STATES PATENTS

| | | |
|---|---|---|
| 140,830 | Ingersoll | July 15, 1873 |
| 541,596 | Curlett | June 25, 1895 |
| 884,187 | Minorsky | Apr. 7, 1908 |
| 1,181,676 | Lambkin | May 2, 1916 |
| 2,294,960 | Carlson | Sept. 8, 1942 |

FOREIGN PATENTS

| | | |
|---|---|---|
| 822,424 | France | Sept. 20, 1937 |